United States Patent [19]
Young, III et al.

[11] Patent Number: 5,920,950
[45] Date of Patent: Jul. 13, 1999

[54] WIPER BLADE ATTACHMENT ADAPTER

[75] Inventors: William D. Young, III, Southfield, Mich.; Roger Daniels, Thornhill, United Kingdom

[73] Assignee: Trico Products Corporation, Rochester Hills, Mich.

[21] Appl. No.: 08/987,688

[22] Filed: Dec. 9, 1997

[51] Int. Cl.⁶ ........................................................ B60S 1/40
[52] U.S. Cl. ................................... 15/250.32; 403/322.1; 403/24; 403/154; 403/101
[58] Field of Search .................... 15/250.32, 250.31, 15/250.361, 250.44; 403/321, 322.1, 24, 154, 101

[56] References Cited

U.S. PATENT DOCUMENTS

| | | | |
|---|---|---|---|
| 4,670,934 | 6/1987 | Epple et al. | 15/250.32 |
| 5,611,103 | 3/1997 | Lee | 15/250.32 |
| 5,632,059 | 5/1997 | Lee | 15/250.32 |

FOREIGN PATENT DOCUMENTS

| | | | |
|---|---|---|---|
| 3331310 | 3/1985 | Germany | 15/250.32 |
| 3416505 | 11/1985 | Germany | 15/250.32 |
| 3423317 | 1/1986 | Germany | 15/250.32 |
| 3434016 | 3/1986 | Germany | 15/250.32 |
| 872862 | 7/1961 | United Kingdom | 15/250.32 |

*Primary Examiner*—Gary K. Graham
*Attorney, Agent, or Firm*—Joseph G. Nauman

[57] ABSTRACT

Two embodiments of a wiper blade attachment adapter are disclosed, each directed to different market areas. Both embodiments incorporate a partially hollow main body defined by side walls with opposed first and second ends, and joined to and spaced apart by a web extending from the end of the adapter to central pin receiving apertures in the side walls. A bar extends between the side walls at the second end, otherwise the space between the side walls is open between the bar at the second end and the web. The region of the web adjacent the pin apertures includes an extension of those apertures, forming a through open passage of generally keyhole configuration, open at its bottom, which can embrace a central retaining pin on the receptacle structure of the wiper's primary lever. A latch member is integrally attached to the first end of the adapter body by a flexible hinge member (e.g. a "living hinge") such that the latch member is a permanent movable part of the adapter. The shape of the latch member corresponds to the hollow within the first end of the adapter body. The latch member has an integral abutment part shaped to conform generally to the outer curve of a wiper arm hook, thus with the arm hook in place within the adapter, the latch member is swung into the hollow and the abutment part prevents releasing motion of the arm hook. The latch member is retained in this locking position by a pair of integral arms having barb-like tips which are flexible enough to slip into notches in the adapter side walls, and can be released by pressing inward against the barb tips. A notch is formed in the end of the latch member to provide a means of pulling the latch member out of a locked position within the adapter body.

5 Claims, 3 Drawing Sheets

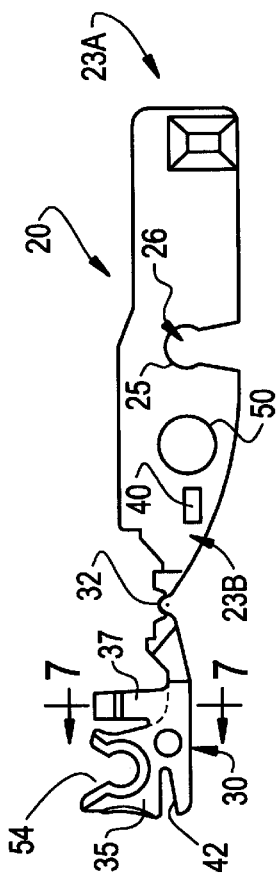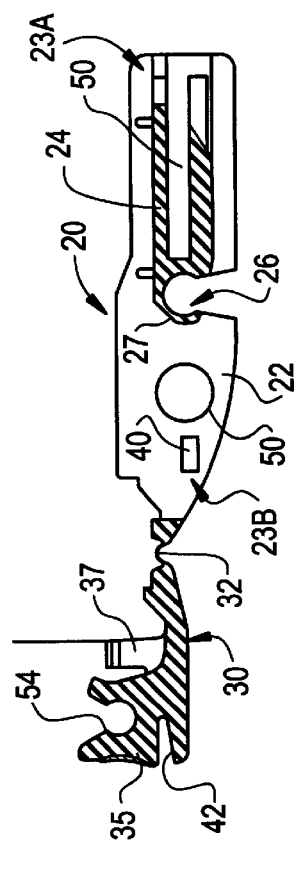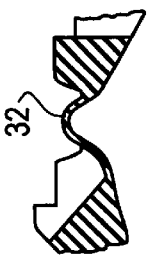
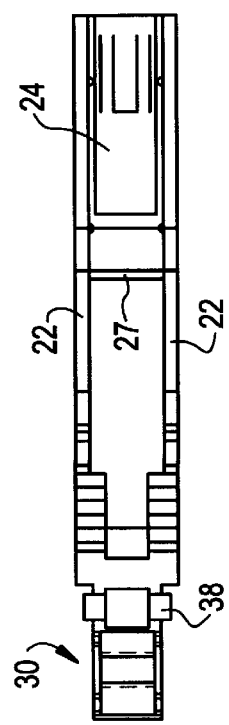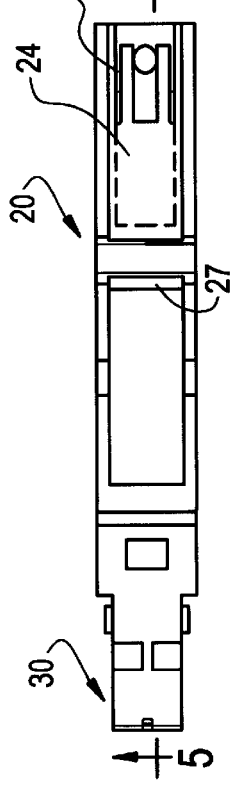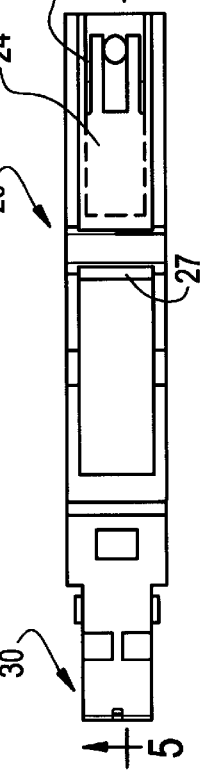

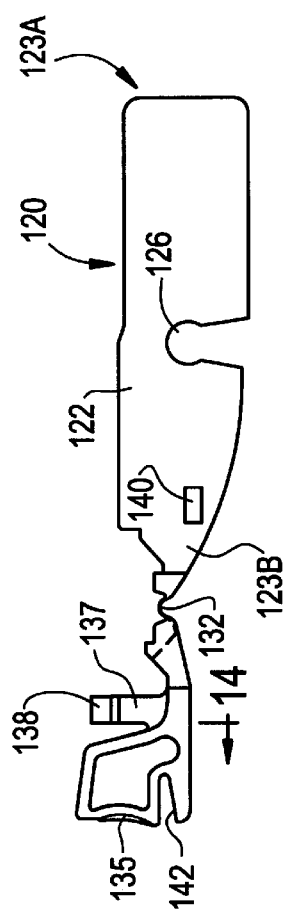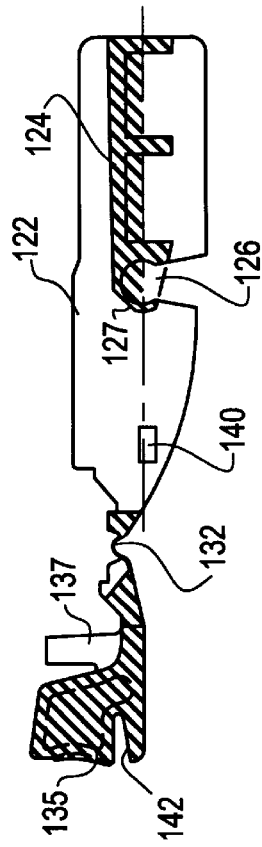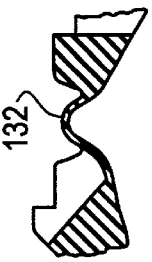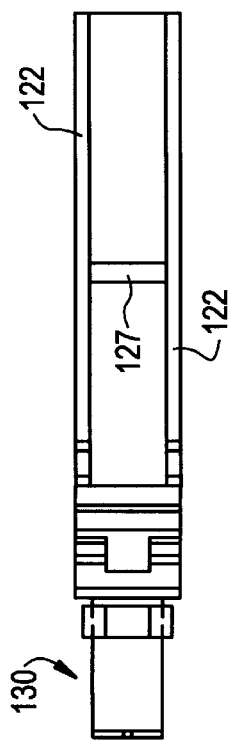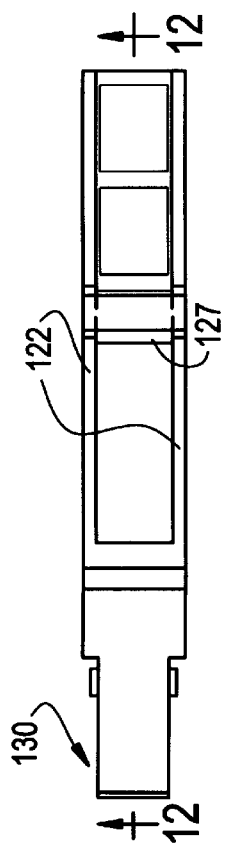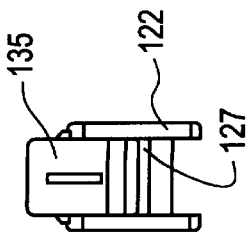

WIPER BLADE ATTACHMENT ADAPTER

This invention relates to an improved adapter for attachment of a windshield wiper blade to a wiper drive arm. Two embodiments of the adapter are disclosed. The first embodiment is a multi-purpose adapter intended for use with replacement (after market) wiper blades which necessitate accommodating a number of different wiper arm end configurations. The second embodiment, which is less complex, is intended for use with original windshield wiper equipment (OEM) and accommodates the hooked end type of arm.

Adapters for these general purposes are known, and typical ones are disclosed in U.S. Pat. Nos. 4,142,268 and 4,296,521, both assigned to Trico Products Corporation, which is also the assignee of this invention.

U.S. Pat. No. 4,142,268 discloses a pair of molded plastic components juxtaposed face to face to form a body, U-shaped in longitudinal cross section on a plane perpendicular to the juxtaposed faces, and include flanges on the sides thereof. The external shape of the assembled body fits into a U-shaped space defined by the end of a wiper arm of the "shepherd's crook kind". The juxtaposed faces each have formed therein a transverse semi-cylindrical recess. When the sections are arranged face to face the recesses form a transverse bore to contain a grooved pin extending transversely from the side of a wiper blade harness. An internal circumferential projection in the recesses engages the groove in the pin; the flanges engage the side edges of the arm. A pair of resilient detentes projecting outwardly from the web portion of the U-shaped body engage the web of the shepherd's crook arm.

U.S. Pat. No. 4,296,521 discloses the combination of a connector, which is an elongate element having parallel side faces and penetrated by a bore perpendicular to the side faces, and a pivot pin which is (in use) received in the bore and protrudes from both ends thereof, the pivot pin being retained in the bore by means of a resiliently supported projection extending either radially into the bore or radially outwardly from the pin, the resilient projection engaging the side walls of either a groove formed in the pin, or of a recess formed in the connector and communicating with the bore. The connector is situated, in use, in an elongate opening in a wiper blade harness, parallel side walls of the opening being formed with holes into which the ends of the pin project to mount the connector pivotally to the wiper blade harness, and the connector is adapted to engage and retain an end of a windscreen wiper arm to effect a pivotal connection between the arm and the blade harness.

There is also an adapter unit, used by several proprietors, which comprises a molded plastic adaptor body configured to receive the hook end of a wiper drive arm, and a separate latch member which is connected to the body with a hinge pin. These parts are separately made and must be assembled. The latch member can swing about the hinge pin into the body when the body is in place on the drive arm, and the latch member includes a cam-like surface on its nose, opposite the hinge pin, which locks against the curved end of the drive arm.

SUMMARY OF THE INVENTION

Two different embodiments of the invention are disclosed, each directed to different market areas. The different embodiments of the present invention both incorporate a partially hollow main body defined by side walls with opposed first and second ends or tips, and joined to and spaced apart by a web portion which extends from the end of the adapter to central pin receiving apertures in the side walls. A bar extends between the side walls at the second end, otherwise the space between the side walls is open between the bar at the second end and the web portion. The region of the web portion adjacent the pin receiving apertures includes an extension of those apertures, whereby there is a through open passage of generally keyhole configuration (open at its bottom), which can embrace the central retaining pin on the receptacle structure of the wiper's primary lever.

A latch member is integrally attached to the first end of the adapter body by a flexible hinge member (e.g. a "living hinge") such that the latch member is a permanent movable part of the adapter. The general shape of the latch member corresponds to the aforementioned space or hollow within the first end of the adapter body.

The latch member has an integral abutment part which is shaped to conform generally to the outer curve of the wiper arm hook, thus with the arm hook in place within the adapter, the latch member is swung into the adapter and the abutment part locks the arm to the adapter by preventing releasing motion of the arm hook. The latch member is retained in this locking position by locking means which include a pair of integral arms having barb-like tips which are flexible enough to slip into notches in the adapter side walls, and can be released by pressing inward against the barb tips. A notch is formed in the end of the latch member to provide a means of pulling the latch member out of a locked position within the adapter body.

In the first embodiment, directed to after market or replacement wiper blades, features are included for attaching the adapter body to either an arm having a straight end, such as in U.S. Pat. No. 4,296,521, or an arm having a side-entering pin such as in U.S. Pat. No. 4,608,728. The straight end of an arm is receivable in a slot within the web portion. A side entering pin is receivable by aligned circular openings in the adapter side walls, and is grasped by a generally key-shaped locking slot on the latch member.

The second embodiment, intended for use with original equipment wipers (OEM), includes only the basic features of the invention and is designed to attach the adapter to the crooked or hooked end of one form of wiper arm.

DESCRIPTION OF THE DRAWINGS

FIG. 2 is a top view of an adapter as provided by the invention;

FIG. 3 is a side view of the adapter shown in FIG. 2;

FIG. 4 is a bottom view of the adapter shown in FIG. 2;

FIG. 5 is a cross-sectional view taken along the line 5—5 in FIG. 4;

FIG. 6 is an end view taken from the left side of FIG. 2;

FIG. 7 is a cross-sectional view taken along line 7—7 in FIG. 3;

FIG. 8 is an enlarged partial cross-sectional view of the hinge area between the adapter main body and the integral lock member, as seen in FIG. 4;

FIG. 9 is a top view of an adapter as provided by the invention;

FIG. 10 is a side view of the adapter shown in FIG. 9;

FIG. 11 is a bottom view of the adapter shown in FIG. 9;

FIG. 12 is a cross-sectional view taken along the line 12—12 in FIG. 11;

FIG. 13 is an end view taken from the left side of FIG. 9;

FIG. 14 is a cross-sectional view taken along line 14—14 in FIG. 10;

FIG. 15 is an enlarged partial cross-sectional view of the hinge area between the adapter main body and the integral lock member, as seen in FIG. 12.

DETAILED DESCRIPTION OF THE PREFERRED EMBODIMENTS

Figure 1:
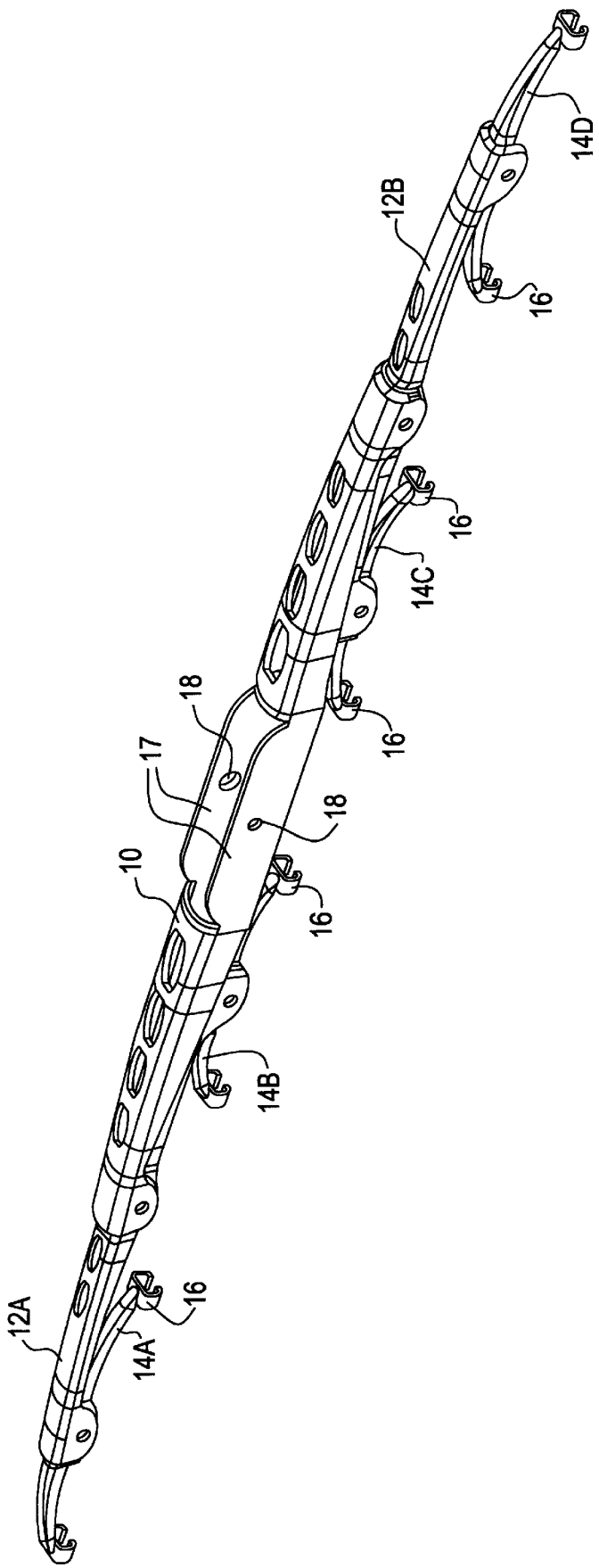
FIG. 1 is a perspective view of a wiper blade superstructure, less the wiping rubber and associated parts.

It should be understood that neither disclosed embodiment is preferred with respect to the other, rather they are simply directed to different windshield wiper markets.

FIG. 1 shows a wiper blade superstructure, by way of example, comprised of a primary lever 10, which has pivotally attached to it a pair of secondary levers 12A, 12B. In turn, the secondary levers each have attached to them tertiary levers 14A, 14B and 14C, 14D, as shown, the tertiary levers including hook portions 16 which provide attachment locations for the wiper rubber (not shown) and the vertebrae (not shown) usually associated with the rubber.

At the top center of primary lever 10 there is a receptacle or socket structure comprising spaced apart walls 17 formed as integral parts of lever 10, and having apertures 18 for receiving a retaining pin. It is this receptacle structure which receives the unique adapters provided by this invention, to function as attachments to an arm (not shown) which is driven in typical oscillating manner so as to wipe the blade rubber back and forth across a predetermined area of a windshield.

FIGS. 2–5 show the first form of adapter as including a partially hollow main body 20 defined by side walls 22 having opposed ends or tips 23A, 23B, and joined to and spaced apart by a web portion 24 which extends from end 23A (the right end in FIGS. 2–5) of the adapter to central pin receiving apertures 25 in side walls 22. A bar extends between walls 22 at end 23B, otherwise the space between the walls is open as seen in FIGS. 2, 4 and 5 between the bar at end 23B and the web portion 24. That region of web portion 24 adjacent apertures 25 includes an extension of those apertures, whereby there is a through passage 26, open at its bottom, of generally keyhole configuration, which can embrace the central retaining pin at the receptacle structure of primary lever 10.

If an arm ending is of the hooked or crook shape, as shown and described in said U.S. Pat. Nos. 4,142,268 and 4,296,521, the hook end of such arm will fit about the upper and lower walls of web portion 24, with the inside curve of the hook resting against the curved end 27 of the web portion (to the left of passage 26 in FIG. 5). An latch member 30 is integrally attached to the tip or end 23B of adapter body 20 by a flexible hinge member 32 (often called a "living hinge") such that the latch member is a permanent movable part of the adapter. The general shape of latch member 30 corresponds to the aforementioned space within the end 23A of the body.

Latch member 30 has an integral abutment part 35 which is shaped to conform generally to the outer curve of the wiper arm hook, thus with the arm hook in place within the adapter, the latch member is swung into the adapter and abutment part 35 locks the arm to the adapter by preventing releasing motion (to the left as in FIG. 5) of the arm hook. Latch member 30 is retained in this locking position by a pair of integral arms 37 having barb-like tips 38 (FIG. 7) which are flexible enough to slip into notches 40 in side wall 22, and can be released by pressing inward against the barb tips 38. A notch 42 is formed in the end of latch member 30 to provide a means of pulling the latch member out of a locking position between side walls 22.

In the embodiment of FIGS. 2–8, features are included for attaching adapter body 20 to either an arm having a straight end (see U.S. Pat. No. 4,296,521, FIG. 11) or an arm having a side-entering pin (see Trico Products Corporation U.S. Pat. No. 4,608,728). The straight end of an arm is receivable in a slot 50 within web portion 24. A side entering pin is receivable by aligned circular openings 52 in side walls 22, and is grasped by a generally key-shaped locking slot 54 on latch member 30, formed within the material of abutment part 35.

Thus, this embodiment of the adapter can attach to a plurality of different wiper arm ends and/or fittings, and is particularly useful in aftermarket situations where a replacement wiper blade may be made attachable to a variety of existing wiper arm structures.

FIGS. 9–15 illustrate another embodiment which has the unique features of the first embodiment, but is designed to attach basically to the crooked or hooked end one form of wiper arm. For ease of understanding, the same reference numerals in the 100 series are used to designate the parts of this embodiment.

Thus, the second form of adapter as including a partially hollow main body 120 defined by side walls 122 having opposed ends or tips A, B, and joined to and spaced apart by a web portion 124 which extends from end A (the right end in FIGS. 9–12) of the adapter to central pin receiving apertures 125 in side walls 122. A bar extends between walls 122 at end B, otherwise the space between the walls is open as seen in FIGS. 9, 11 and 12 between the bar at end B and the web portion 124. That region of web portion 124 adjacent apertures 125 includes an extension of those apertures, whereby there is a through passage 126, open at its bottom, of generally keyhole configuration, which can embrace the central retaining pin at the receptacle structure of primary lever 10.

An arm ending in a hooked or crook shape, as shown and described in said U.S. Pat. Nos. 4,142,268 and 4,296,521, the hook end of such arm will fit about the upper and lower walls of web portion 124, with the inside curve of the hook resting against the curved end 127 of the web portion (to the left of passage 126 in FIG. 12). An latch member 130 is integrally attached to the tip or end B of adapter body 120 by a flexible hinge member 132 (e.g. a "living hinge") such that the latch member is a permanent movable part of the adapter. The general shape of latch member 130 corresponds to and will fit within the aforementioned space or hollow within the end A of the body.

Latch member 130 has an integral abutment part 135 which is shaped to conform generally to the outer curve of the wiper arm hook, thus with the arm hook in place within the adapter, the latch member is swung into the adapter and abutment part 135 locks the arm to the adapter by preventing releasing motion (to the left as in FIG. 12) of the arm hook. Latch member 130 is retained in this locking position by a pair of integral arms 137 having barb-like tips 138 (FIG. 14) which are flexible enough to slip into notches 140 in side walls 122, and can be released by pressing inward against the barb tips 138. A notch 142 is formed in the end of latch member 130 to provide a means of pulling the latch member out of a locking position between side walls 122.

While the forms of apparatus herein described constitutes preferred embodiments of this invention, it is to be understood that the invention is not limited to these precise forms of apparatus, and that changes may be made therein without departing from the scope of the invention which is defined in the appended claims.

What is claimed is:

1. An adapter for attaching a windshield wiper primary lever to a wiper drive arm, comprising a main adapter body, side walls having opposite first and second ends joined to and spaced apart by a web portion, central pin receiving apertures in said side walls including extensions forming keyhole openings for receiving a retaining pin in a wiper primary lever, a bar joining said side walls at said second end leaving a hollow space between said second end and said web portion, a latch member integrally and pivotally attached to said second end and configured to fit within said hollow space, means for locating said latch member in said hollow space to prevent disengagement of a wiper drive arm from said adapter main body, means for locking said latch member in operative locking position within said hollow space including a pair of arms formed on said latch member and having barbs thereon, and notches formed in said side walls to receive said barbs when said latch member is swung into its operative position.

2. An adapter as defined in claim 1, wherein said latch member includes aligned openings in said side walls for receiving a side-entering pin on a wiper drive arm, and a key-shaped locking slot dimensioned so as to register with said aligned openings and to snap about a side-entering pin extending through said aligned openings, said latch member having a forward end located to prevent disengagement of a crook on a wiper drive arm from said adapter main body.

3. An adapter as defined in claim 1, including an abutment part formed on said latch member opposite from said integral attachment, said abutment part being contoured to generally match the curved end of a hook on a wiper drive arm.

4. An adapter as defined in claim 3, further including a notch formed in said free end of said latch member providing a means for pulling said latch member from its operative locking position.

5. An adapter for attaching a windshield wiper primary lever to a wiper drive arm, comprising a main adapter body including side walls having opposite first and second ends joined to and spaced apart by a web portion, said web portion being configured to receive a curved end of a wiper drive arm, central pin receiving apertures in said side walls including extensions forming keyhole openings for receiving a retaining pin on a wiper primary lever, said side walls at said second end defining a hollow space between said second end and said web portion, a latch member pivotally attached by an integral hinge strip to said second end and configured to fit within said hollow space, said latch member including an abutment part contoured to fit the curved end of a wiper drive arm, means for locating said latch member in said hollow space to prevent disengagement of a wiper drive arm positioned about said web portion, means for locking said latch member in operative locking position within said hollow space including a pair of arms formed on said latch member and having barbs thereon, and notches formed in said side walls to receive said barbs when said latch member is swung into its operative position.

* * * * *